United States Patent
Raghavan

(10) Patent No.: US 7,900,191 B1
(45) Date of Patent: Mar. 1, 2011

(54) SYSTEM AND METHOD OF USING AN ACTIVE LINK IN A STATE PROGRAMMING ENVIRONMENT TO LOCATE AN ELEMENT IN A GRAPHICAL PROGRAMMING ENVIRONMENT

(75) Inventor: Vijay Raghavan, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 1404 days.

(21) Appl. No.: 11/157,382

(22) Filed: Jun. 20, 2005

(51) Int. Cl.
*G06F 9/45* (2006.01)
(52) U.S. Cl. .................................................. 717/113
(58) Field of Classification Search ................... 717/113
See application file for complete search history.

(56) References Cited

U.S. PATENT DOCUMENTS

| | | | |
|---|---|---|---|
| 6,510,468 B1 * | 1/2003 | Hayne ........................ 709/246 |
| 6,976,243 B2 * | 12/2005 | Charisius et al. ............. 717/108 |
| 2001/0030651 A1 * | 10/2001 | Doyle ........................... 345/581 |
| 2002/0152236 A1 * | 10/2002 | Incertis-Carro ............ 707/501.1 |
| 2003/0182196 A1 * | 9/2003 | Huang .......................... 705/26 |
| 2004/0125121 A1 * | 7/2004 | Pea et al. ...................... 345/716 |
| 2004/0221238 A1 * | 11/2004 | Cifra et al. ................... 715/762 |
| 2008/0098349 A1 * | 4/2008 | Lin et al. ...................... 717/106 |

* cited by examiner

*Primary Examiner*—John Chavis
(74) *Attorney, Agent, or Firm*—Nelson Mullins Riley & Scarborough LLP; Kevin J. Canning

(57) ABSTRACT

A system, method, distribution system, and computer readable medium for locating an element of a computing environment are described. The invention feature selecting a label within a state diagram associated with a graphical model and processing the selected label to generate a location identifier. The invention also features analyzing the location identifier to determine which element of a graphical model is associated with the location identifier and positioning the graphical model to display the element associated with the location identifier to a user viewing the graphical model.

25 Claims, 10 Drawing Sheets

SYSTEM AND METHOD OF USING AN ACTIVE LINK IN A STATE PROGRAMMING ENVIRONMENT TO LOCATE AN ELEMENT IN A GRAPHICAL PROGRAMMING ENVIRONMENT

FIELD OF THE INVENTION

The present invention relates to graphical programming or modeling environments, in particular to methods, systems and computer program products for using an active link in a state programming environment to locate an element in a graphical programming or modeling environment.

REFERENCE TO COMPUTER PROGRAM LISTING APPENDIX

Submitted herewith are two identical compact disks created on Jun. 18, 2005 having a total of 36.0 Kbytes. Included on each compact disk are the files code_for_mapping.m, symbol_resolution.cpp, and parser.yac, the entire contents of which are incorporated by reference herein.

BACKGROUND OF THE INVENTION

Simulink® from The MathWorks, Inc. of Natick, Mass., provides tools for modeling and simulating a variety of dynamic systems in one integrated, graphical environment. Simulink® enables users to design a block diagram for a target system, simulate the behavior of the system, analyze the performance of the system, and refine the design of the system. A block defines a dynamic system within a block diagram. The relationships between each elementary dynamic system in a block diagram are illustrated by the use of signals connecting the blocks. Collectively the blocks and lines in a block diagram describe an overall dynamic system.

Simulink® allows users to design target systems through a user interface that allows drafting of block diagrams of the target systems. All of the blocks in a block library provided by Simulink® and other programs are available to users when the users are building the block diagram of the target systems. Individual users may be able to customize this set of available blocks to: (a) reorganize blocks in some custom format; (b) delete blocks they do not use; and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems.

FIG. 1 shows an example of a Simulink® model. The Simulink® model contains blocks and arrows that connect the blocks. Each arrow connecting one block to another block represents a signal having a value. In the model shown in FIG. 1, input Signal 100 generates an input signal and sends the signal to a Sum block 102 via link 110. Link 114 communicates the value of the continuous-time state of the Integrator block 104 as a signal from the Integrator block 104 to a Scope block 108 for display, and also sends the signal to a Gain block 106 through link 116. Gain block 106 performs calculation on the input signal from link 116 and outputs the result through link 116 to the Sum block 102. The Sum block 102 adds the signal from link 110 and the signal from link 118 and outputs the result through link 112 to the Integrator block 104. The Integrator block 104 takes the signal from link 112 and performs integration on the value forwarded by the signal to produce an updated output on link 114 at a new point in time. The model continues on indefinitely or until a predetermined condition is achieved, a time period is attained, the user interrupts the execution, or any other termination condition is met.

Stateflow® from The MathWorks, Inc. of Natick, Mass., provides a state-based and flow diagram environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

An example of a state diagram model created using Stateflow® is shown in FIG. 2A. Each arrow in the Stateflow® models represents a transition, which is a graphical object that, in most cases, links one object to another. One end of a transition is attached to a source object and the other end to a destination object. The source is where the transition begins and the destination is where the transition ends. A transition label describes the circumstances under which the system moves from one state to another. It is always the occurrence of some event that causes a transition to take place. The exemplar Stateflow® diagram as shown in FIG. 2A is embedded in a Simulink® environment. The Simulink® signals are provided to Stateflow®, and Stateflow® uses this information to decide whether there are changes in states.

Within the Stateflow® diagram of FIG. 2A, there are two states: an on state 120 and an off state 122. The default transition 126 determines the initial state is the off state 122. When an on_switch transition 130 is enabled, the enable signal passes to junction 124 and determines whether the temp 158 data is greater or equal to 30, if not, then the enable signal is passed on to signal link 132 and further finish the transition to the on state 120. Now the on state 120 is active and off state 122 inactive. The off state 122 will become active again when the off_switch signal 128 is enabled, at which time the on state 120 will become inactive.

When a user is viewing a state diagram, it is often difficult to determine function-call connectivity and components of the related Simulink® subsystem. For example, when editing a state diagram it can be difficult to determine which element of the block diagram environment the Stateflow® state variable is related to. To illustrate further, FIG. 2B shows a Stateflow® diagram and FIG. 2C depicts a related Simulink® model. When a user is editing the Stateflow® diagram of FIG. 2B, the user may not know or may have forgotten that the call 260 to CALC_TH is related to the Threshold_Calculation 270 subsystem of FIG. 2C. The difficulty in determining this function-call connectivity can result in decreases in modeling efficiency.

Therefore, a need exists for a system, method, and computer implemented product that uses an active link in a state programming environment to locate an element in a graphical programming environment.

SUMMARY OF THE INVENTION

The present invention provides programming or modeling environments in which an active link in a state programming environment is used to locate an element in a programming environment. As used herein, the terms "program/programming" and "model/modeling" will be used interchangeably in the description of the present invention.

In one aspect, the invention features a method of locating an element of a programming environment. The method includes selecting a label within a state diagram associated with a graphical model and processing the selected label to generate a location identifier. The method also includes analyzing the location identifier to determine which element of a graphical model is associated with the location identifier and positioning the graphical model to display the element associated with the location identifier to a user viewing the graphical model.

In another aspect, the invention features a system for locating an element of a programming environment. The system includes a graphical user interface and an analyzer. The graphical user interface displays a state diagram having a label associated with an element of another portion of the graphical programming environment. The analyzer module processes a selected label within the state diagram to generate a location identifier and determine which element of the graphical programming environment is associated with the location identifier.

In yet another aspect, the invention features a computer readable medium having instructions for locating an element of a programming environment. The instructions cause a processor to select a label within a state diagram associated with a graphical model, and process the selected label to generate a location identifier. The instructions also cause the processor to analyze the location identifier to determine which element of a graphical model is associated with the location identifier and position the graphical model to display the element associated with the location identifier to a user viewing the graphical model.

In still another aspect, the invention features a distribution system for transmitting via a transmission medium computer data signals representing device readable instructions for a method for locating an element of a programming environment. The instructions include selecting a label within a state diagram associated with a graphical model, and processing the selected label to generate a location identifier. The instructions also include analyzing the location identifier to determine which element of a graphical model is associated with the location identifier and positioning the graphical model to display the element associated with the location identifier to a user viewing the graphical model.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Certain embodiments of the present invention are described below. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical programming or modeling environment in which a graphical program or model is simulated/executed, analyses such as sensitivity and trim computations are performed, or code is generated for the model. The terms "program/programming" and "model/modeling" will be interchangeably used in the description of the illustrative embodiment. In the description of the illustrative embodiment, the simulation of the graphical program/model is also referred to as the execution of the program/model.

The described embodiment will be described below solely for illustrative purposes relative to a time-based block diagram environment and/or a state-based and flow diagram environment. Although the illustrative embodiment will be described relative to the time-based block diagram environment and/or the state-based and flow diagram environment, one of skill in the art will appreciate that the present invention may apply to other graphical programming/modeling environments, including data flow diagram environments and Unified Modeling Language (UML) environments, and other non-graphical programming/modeling environments.

The illustrative embodiment will be described below relative to a Simulink® model and a Stateflow® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

Figure 1:
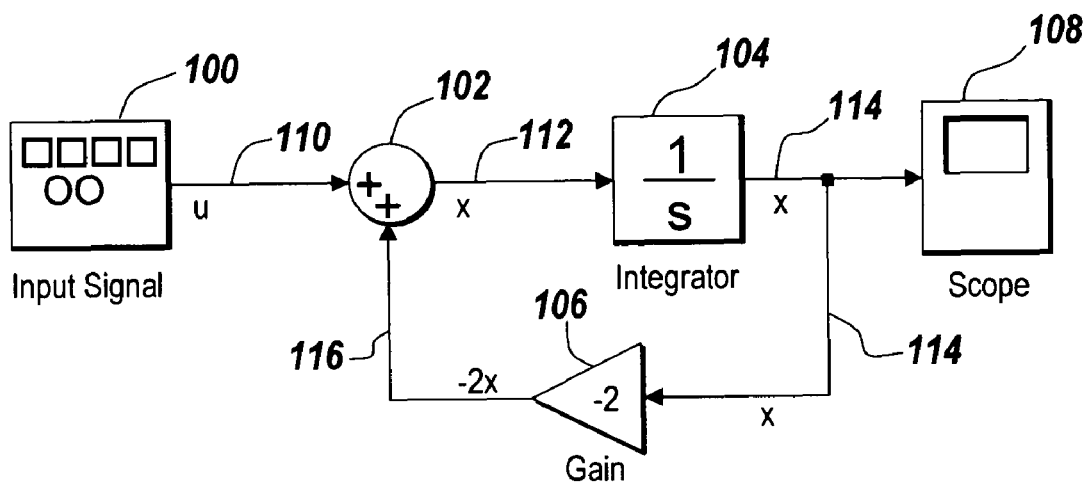
FIG. 1 shows an exemplary Simulink® model.
Figure 2A:
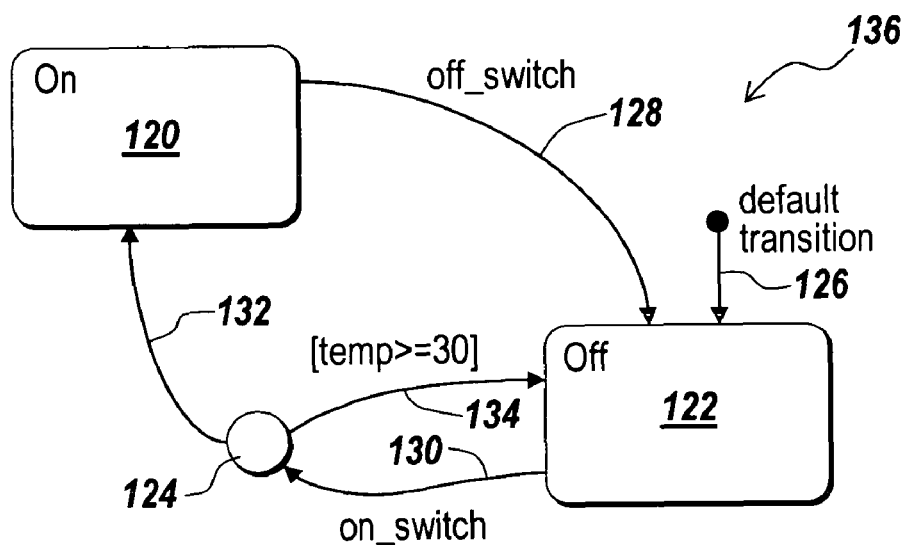
FIG. 2A shows an exemplary Stateflow® diagram.
Figure 2B:
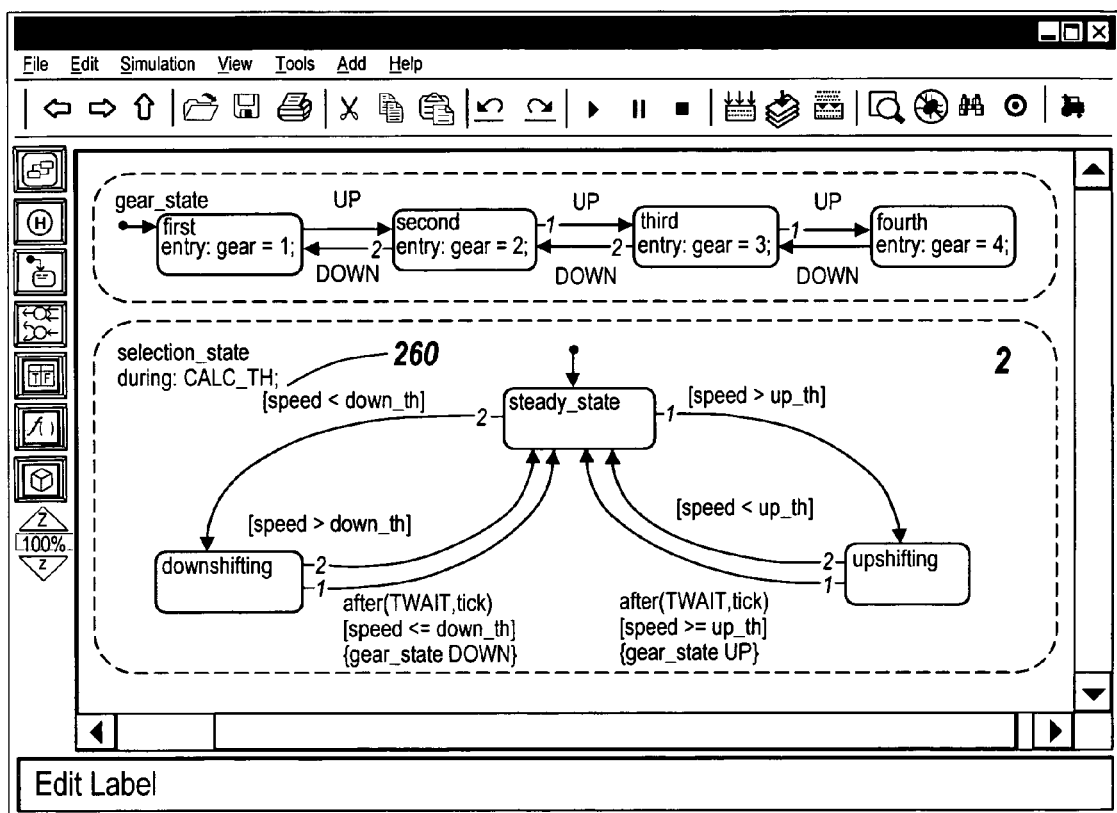
FIG. 2B shows another exemplary Stateflow® diagram.
Figure 2C:
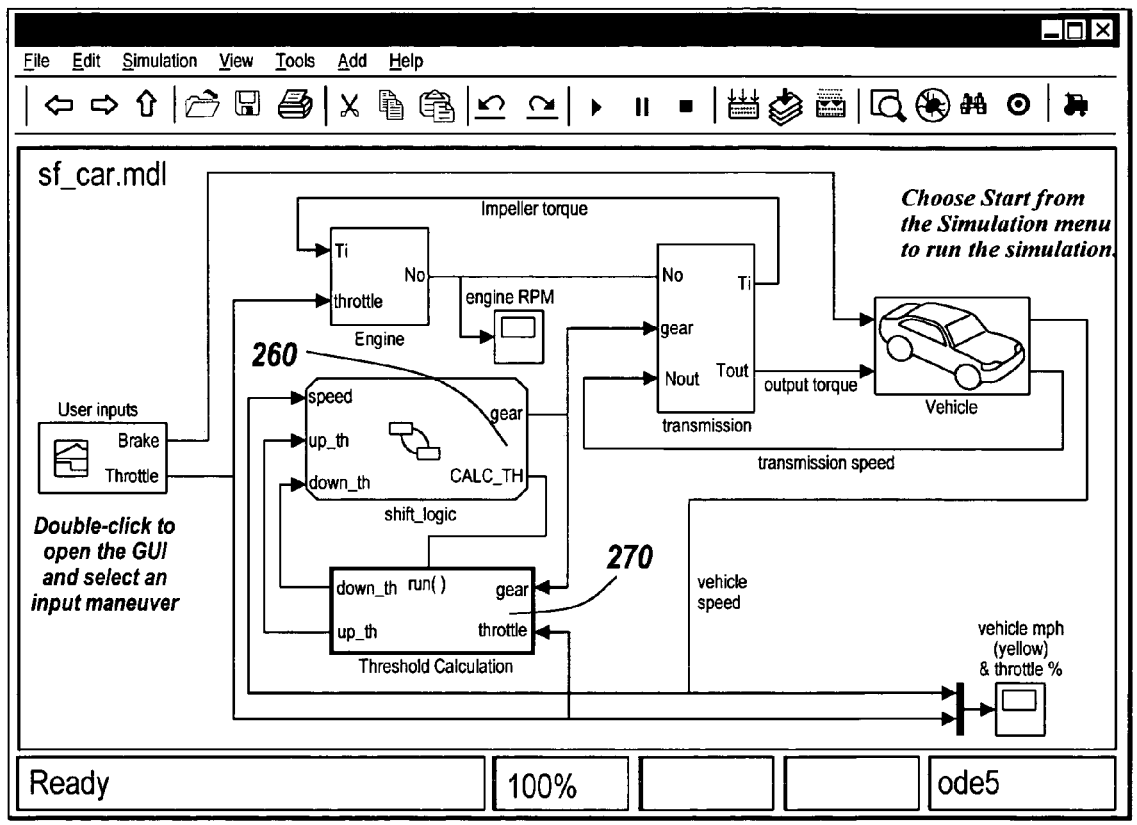
FIG. 2C shows another exemplary Simulink® model.
Figure 3:
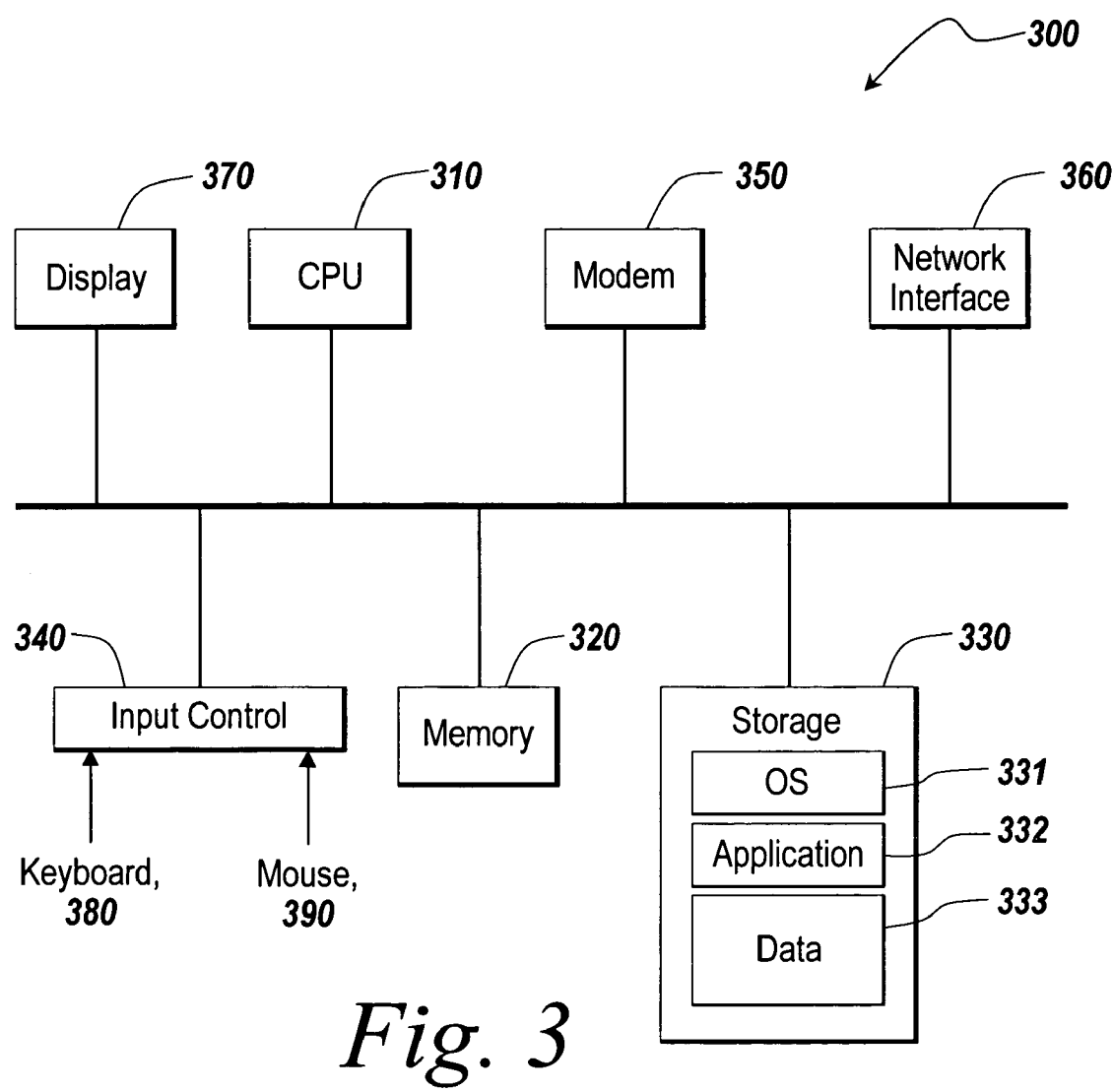
FIG. 3 shows an exemplary computing device suitable for practicing principles of the invention.

FIG. 3 is an exemplary computing device 300 suitable for practicing the illustrative embodiment of the present invention, which provides a block diagram environment. One of ordinary skill in the art will appreciate that the computing device 300 is intended to be illustrative and not limiting of the present invention. The computing device 300 may take many forms, including but not limited to a workstation, server, network computer, quantum computer, optical computer, bio computer, Internet appliance, mobile device, a pager, a tablet computer, and the like.

The computing device 300 may be electronic and include a Central Processing Unit (CPU) 310, memory 320, storage 330, an input control 340, a modem 350, a network interface 360, a display 370, etc. The CPU 310 controls each component of the computing device 300 to provide the block diagram environment. The memory 320 temporarily stores instructions and data and provides them to the CPU 310 so that the CPU 310 operates the computing device 300 and runs the block diagram environment. The storage 330 usually contains software tools for applications. The storage 330 includes, in particular, code 331 for the operating system (OS) of the device 300, code 332 for applications running on the operation system including applications for providing the block diagram environment, and data 333 for block diagrams created in the block diagram environment and for one or more coding standards applied to the block diagrams.

The input control 340 may interface with a keyboard 380, a mouse 390, and other input devices. The computing device 300 may receive through the input control 340 input data necessary for creating block diagrams, such as the selection of the attributes and operations of component blocks in the block diagrams. The computing device 300 may also receive input data for applying a coding standard to a block diagram, such as data for selecting the coding standard, data for customizing the coding standard, data for correcting the violation of the coding standard in the block diagram, etc. The computing device 300 may display in the display 370 user interfaces for the users to edit the block diagrams. The computing device 300 may also display other user interfaces, such as a user interface for selecting a coding standard, a user interface for customizing the coding standard, a user interface for displaying a corrected block diagram that removes the violation of the coding standard, etc.

Figure 4:
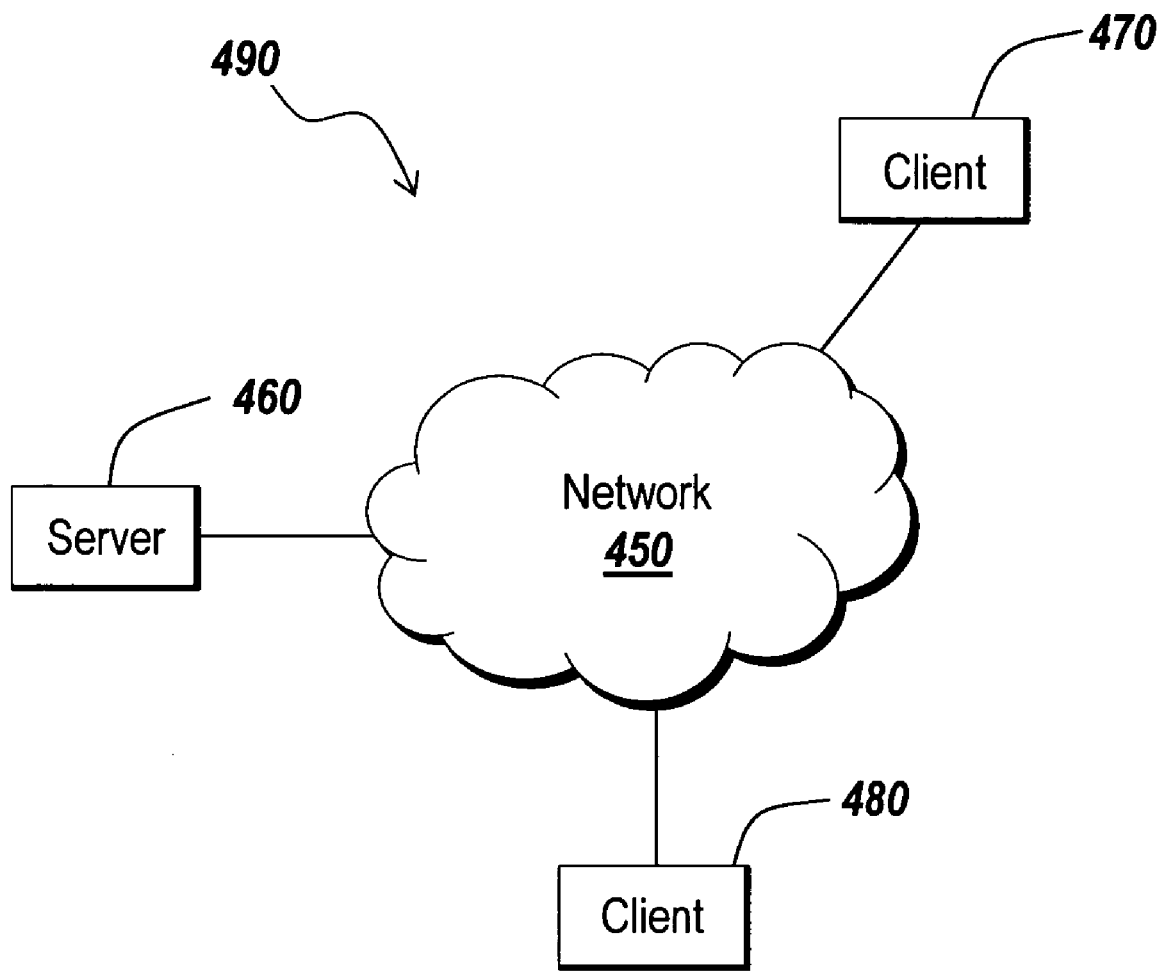
FIG. 4 shows an exemplary network environment suitable for practicing principles of the invention.

FIG. 4 is an exemplary network environment 490 suitable for the distributed implementation of the illustrative embodiment. The network environment 490 may include a server 460 coupled to clients 470 and 480 via a communication network 450. The server 460 and clients 470 and 480 can be implemented using the computing device 300 depicted in FIG. 3. The network interface 360 and the modem 350 of the computing device 300 enable the server 460 to communicate with the clients 470 and 480 through the communication network 450. The communication network 450 may include Internet, intranet, LAN (Local Area Network), WAN (Wide Area Network), MAN (Metropolitan Area Network), etc. The communication facilities can support the distributed implementations of the present invention. It should be understand that more than one server can be used in the distribution environment.

In the network environment 490, the server 460 may provide the clients 470 and 480 with software components or products under a particular condition, such as a license agreement. The software components or products may include those for providing a block diagram environment and those for creating a block diagram in the block diagram environment. The software components or products may also include those for providing one or more coding standards and those for applying the coding standard to the block diagram. The server 460 may send the clients 470 and 480 the software components or products under a specific license agreement.

Figure 5:
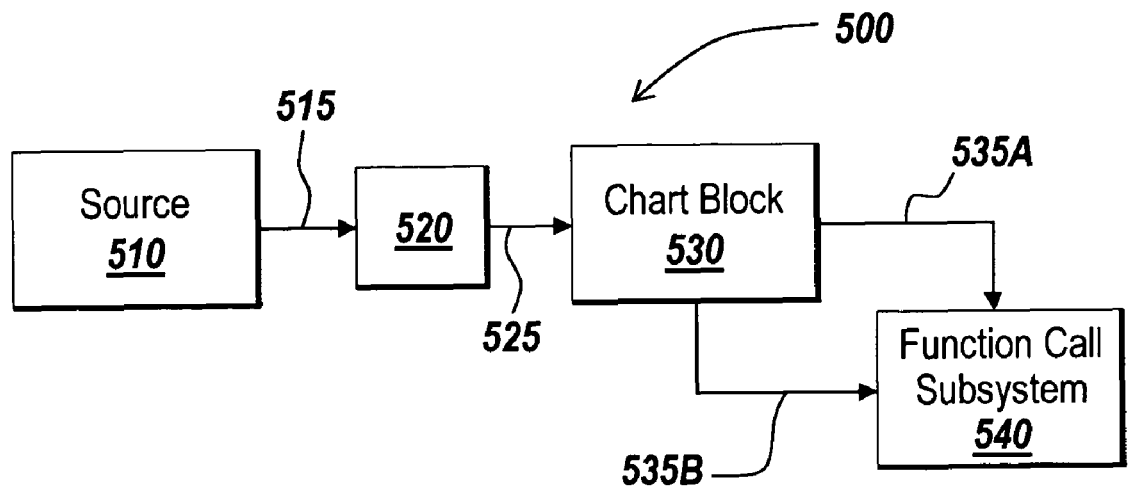
FIG. 5 shows an abstracted Simulink® model suitable for practicing principles of the invention.

FIG. 5 shows an abstracted Simulink® model in which principles of the present invention can be practiced. The model 500 includes a source block 510, a user-defined function block 520, a chart block 530, which can also be thought of as a state machine, and a function-call subsystem block 540. The source block 510 is coupled with the user-defined function block, 520, which is coupled with the chart block 530. In this embodiment, a control output 535A and value output 535B are coupled with the function-call subsystem block 540.

The source block provides a source output 515 to the user-defined function block 520. In one embodiment, the user-defined function block 520 is an embedded MATLAB® function. As used herein, an embedded MATLAB® function refers to block that allows a user to compose a MATLAB® language function in a Simulink model to generate embeddable code. In an embedded MATLAB® function block, the user creates functions with a rich subset of the MATLAB® language. Later, when the user simulates the model or generates code for a target environment, a function that is included as part of the embedded MATLAB® function block generates C code. The user-defined function block 520 provides an output 525 that is used as an input to chart block 530.

The chart block 530 represents a Stateflow® diagram that the user builds using Stateflow® objects. The chart block 530 may be created by using menu commands present within the Simulink® programming model. The chart provides state machine functionality within the graphical programming environment. The chart block 530 provides a means to schedule execution of the function-call subsystem block 540. The control output 535A and the value output 535B are provided to the function-call subsystem block 540.

The function-call subsystem block 540 represents a subsystem that can be invoked as a function by another block of the model 500. As used herein, a function-call subsystem refers to a function whose execution is determined by logic internal to an S-function. As used herein, an S-function refers to a computer language description of a Simulink® block. The function-call subsystem block 540 executes in response to information or data provided from the chart block 530. Said another way, an action within the chart block 530 invokes the execution of the function subsystem block 540. This example illustrates what is also known as function-call connectivity.

Figure 6A:
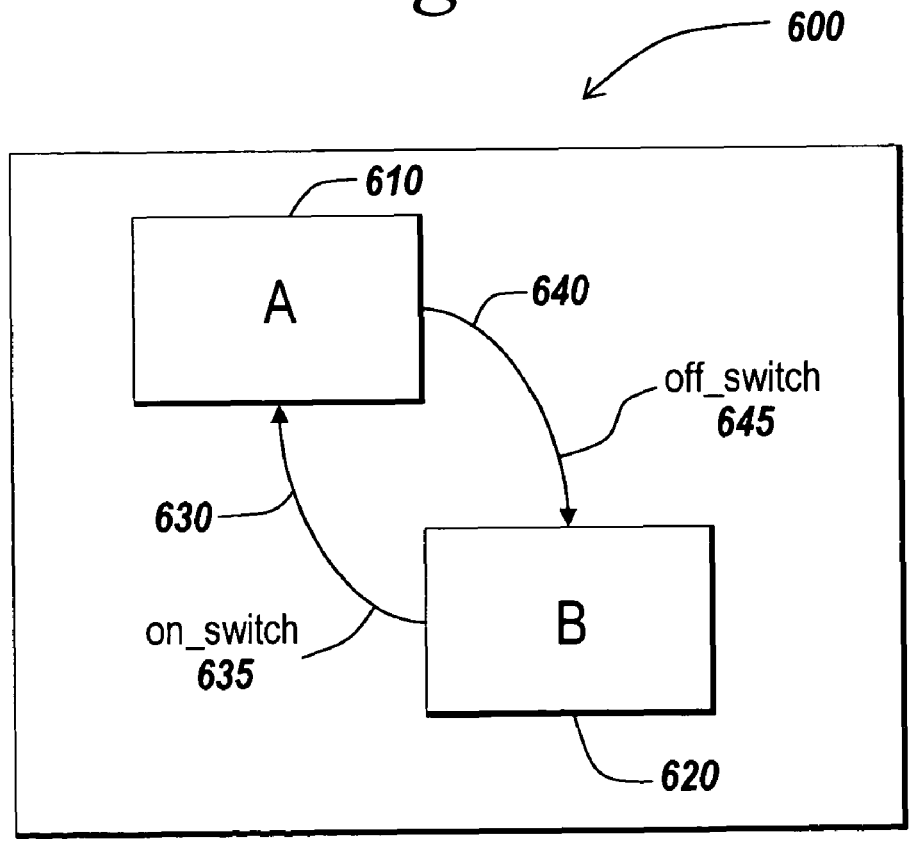
FIG. 6A shows an abstraction of a Stateflow® diagram suitable for practicing principles of the invention.

With reference to FIG. 6A, an abstracted Stateflow® diagram is shown. A state diagram 600 is created with a graphical editor (not shown) that is included as part of the graphical programming environment. The state diagram can include both graphical objects and non-graphical objects. Examples of graphical objects include state boxes, transitions, charts, history junctions, default transitions, connective junctions, truth table functions, graphical functions, embedded MATLAB® functions, boxes, and the like. Examples of non-graphical objects include, but are not limited to, event objects, data objects, and target objects.

An event is a Stateflow® object that can trigger a whole Stateflow® chart or individual actions in a chart. Because Stateflow® charts execute by reacting to events, the user specifies and programs events into charts to control their execution. The user can broadcast events to every object in the scope of the object sending the event, or the user can send an event to a specific object. The user can define explicit events that the user specifies directly, or the user can define implicit events to take place when certain actions are performed, such as entering a state.

A Stateflow® chart stores and retrieves data that it uses to control its execution. Stateflow® data resides in its own workspace, but the chart can also access data that resides externally in the Simulink® model or application that embeds the Stateflow® machine.

The user can build targets in Stateflow® to execute the application the user programs in Stateflow® charts and the Simulink® model that contains them. A target refers to a program that executes a Stateflow® model or a Simulink® model containing a Stateflow® machine. The user can build a simulation target (named sfun) to execute a simulation of the model. The user can build a Real-Time Workshop® target (named rtw) to execute the Simulink® model on a supported processor environment. The user can also build custom targets (with names other than sfun or rtw) to pinpoint the application to a specific environment.

The state diagram 600 includes a first state 610 and a second state 620 that are connected by transitions 630, 640. Each of the transitions 630, 640 includes a transition label 635, 645, respectively, that describes the circumstances under which a change from one state to another occurs. The transition labels 635, 645 can include any alphanumeric and special character combination or discrete actions. The transition labels 635, 645 can define data, events, function calls, and states. For example, transition label 645 can reference off_switch while transition label 635 can reference on_switch. As expected, these labels describe transitions between the on and off states for a switch.

Figure 6B:
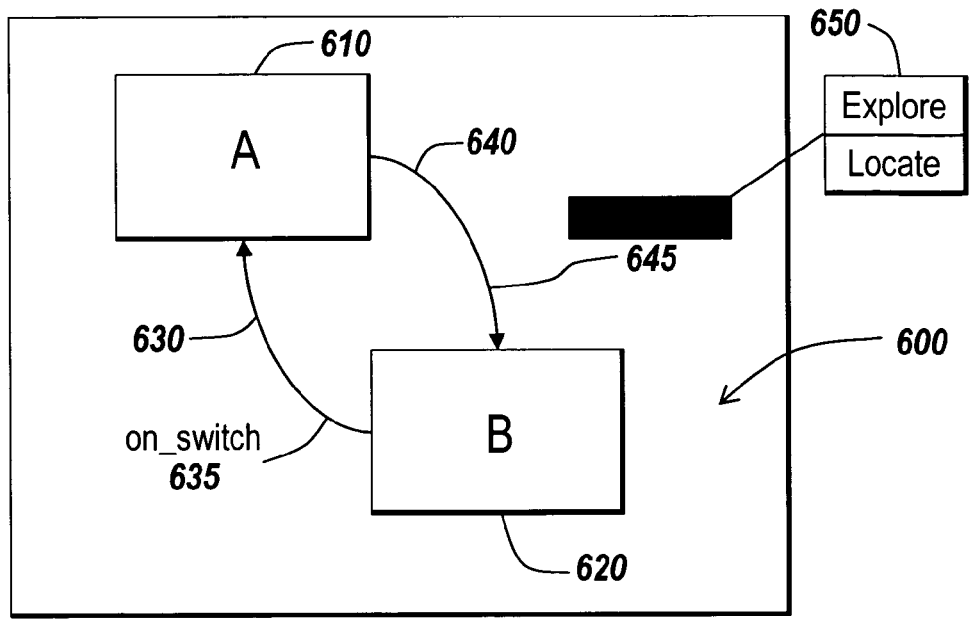
FIG. 6B shows another embodiment of an abstraction of a Stateflow® diagram suitable for practicing the invention.

In one embodiment, in order to locate the associated graphical element of the graphical programming environment the user selects the transition label 635. Selection can include, but is not limited to, clicking, highlighting, and hovering over the transition label 635. In one embodiment, the transition label 635 is represented as a hyperlink. The properties, such as color, size, and text formatting, can be user controller or predefined. In another embodiment, the transition label 635 is presented as a hot spot. In such an embodiment, when positioning the cursor over the hot spot a context menu 650, as shown in FIG. 6B, is shown to the user that allows the user to select a "locate" function. In yet another embodiment, the label appears as just regular text and upon highlighting the label or any portion thereof and right clicking, the context menu 650 is display to the user that includes an option to "locate" the related function.

In response to selecting a transition label, the corresponding graphical element of the graphical programming environment is located within the graphical model and displayed to the user. In some additional embodiments, when the element includes configurable parameters, the element is opened for editing by the user. Generally, this operation can be described as selecting text in a Stateflow® diagram and, as a result, opening the related Simulink® subsystem. It should also be noted that this concept can be applied for use with embedded MATLAB® scripts. For example, a user can select a variable from within the embedded MATLAB® script, right-click on the selected variable, and select the "locate" function from a context menu.

Figure 7:
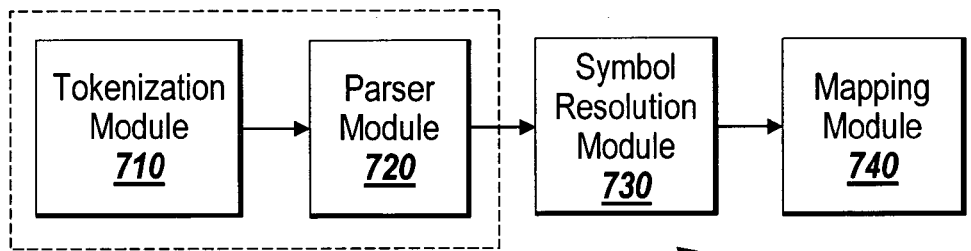
FIG. 7 shows a block diagram of software modules suitable for practicing principles of the invention.

With reference to FIG. 7, a conceptual block diagram is described that provides a system 700 to resolve the location of the graphical element of the graphical programming environment that is associated with the text of the state diagram. In one embodiment, the system 700 includes a tokenization module 710, a parsing module 720, a symbol resolution module 730, and a mapping module 740. Although each module is listed specifically, it should be understood that the functionality of each module can be implemented as a single or multiple programming modules.

Figure 8:
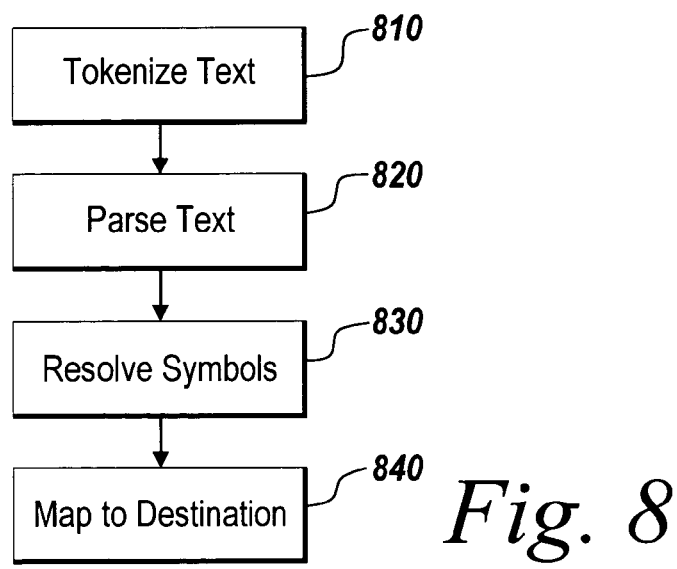
FIG. 8 shows a flow chart of an embodiment of a method of locating an element of a graphical programming environment according to principles of the invention.

In operation and with reference to FIG. 8, the tokenization module 710 and parsing module tokenize (step 810) and parse (step 820) the selected text to generate symbols. In one embodiment, the parser module 710 and the tokenization module 720 can be implemented as a single module known as FPARSER that is distributed as part of the Simulink® program. Operationally, FPARSER parses an M-file or command line and list tokens and constructs functions/keywords, variables/constants, and struct field assignments. It should be understood that other parsing and tokenization modules can be used. In one embodiment, the set of grammar rules by the tokenization and parsing module is the parser.yac file, which can be found on the included compact disk.

After parsing the text of the transition label, the symbol resolution module 730 performs (step 830) a hierarchical resolution of the symbols to generate location identifiers. Examples of location identifiers can include, but are not limited to, data handles, function handles, event handles, and the like. In one embodiment, the computer code of the file symbol_resolution.cpp, which can be found on the included compact disk, is used to perform symbol resolution: The parsed and tokenized label maybe resolved to a handle that directly identifies the related function-call subsystem of the Simulink® model.

The mapping module 740 uses the location identifiers to perform event-to-port mapping (step 840), which determines which port of the chart block is associated with the location identifier. The connector from the identified port is followed to its destination to reveal the associated subsystem. Once identified, in one embodiment the graphical programming environment is positioned such that it is displayed to the user and opened for editing by the user. In order to position the graphical programming environment, a depth first graphical search that is robust to cycles is employed by the mapping module 740. The mapping function is capable of following "goto" and "from" blocks. Also, the mapping function can "drill down" on subsystem ports. For example, a subsystem can have another subsystem within itself. In one embodiment, the computer code of the file code_for_mapping.m, which can be found on the included compact disk, is used to perform the mapping functionality.

Figure 9A:
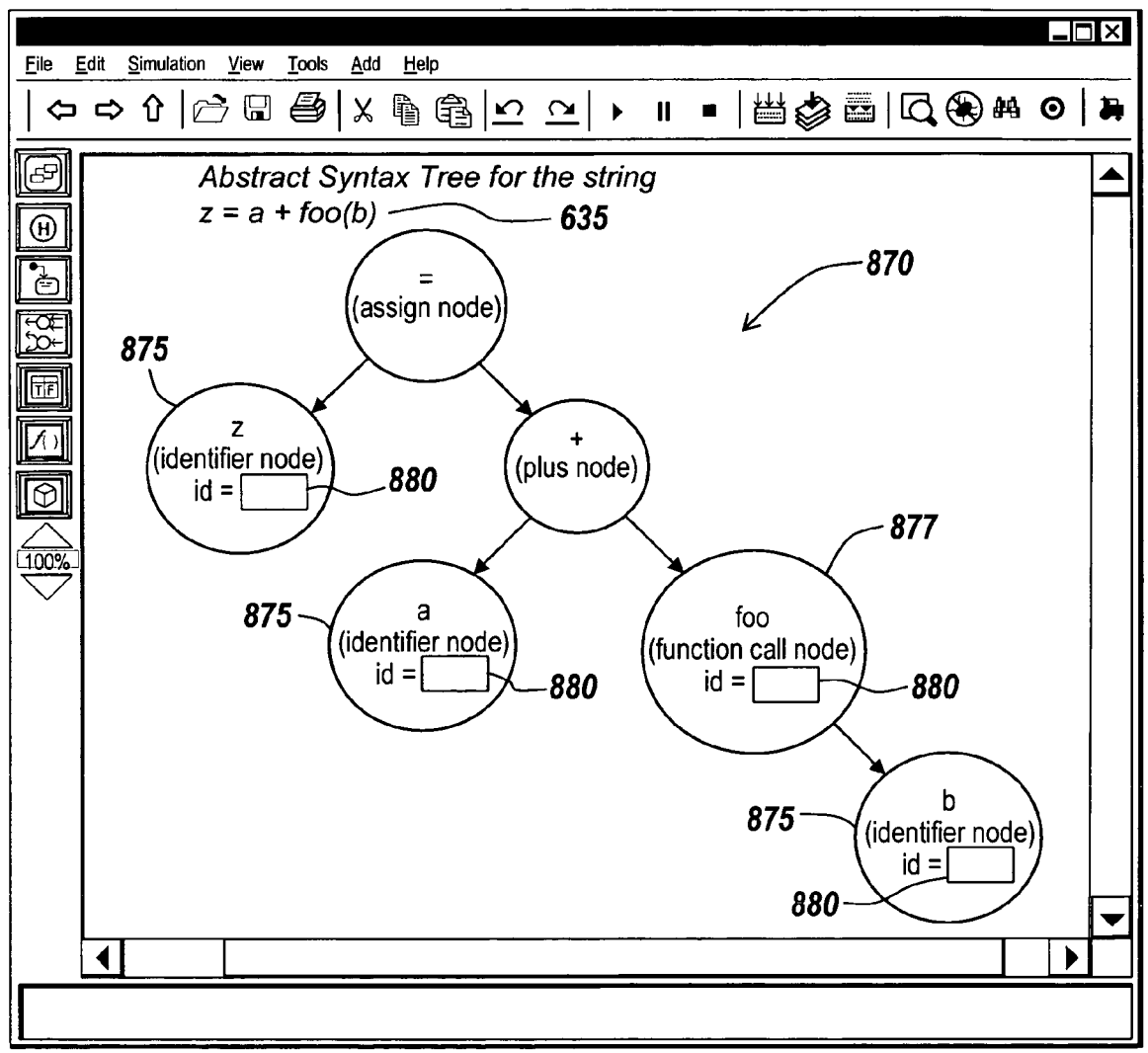
FIGS. 9A and 9B show embodiments of an abstract syntax tree suitable for practicing principles of the invention.
Figure 9B:
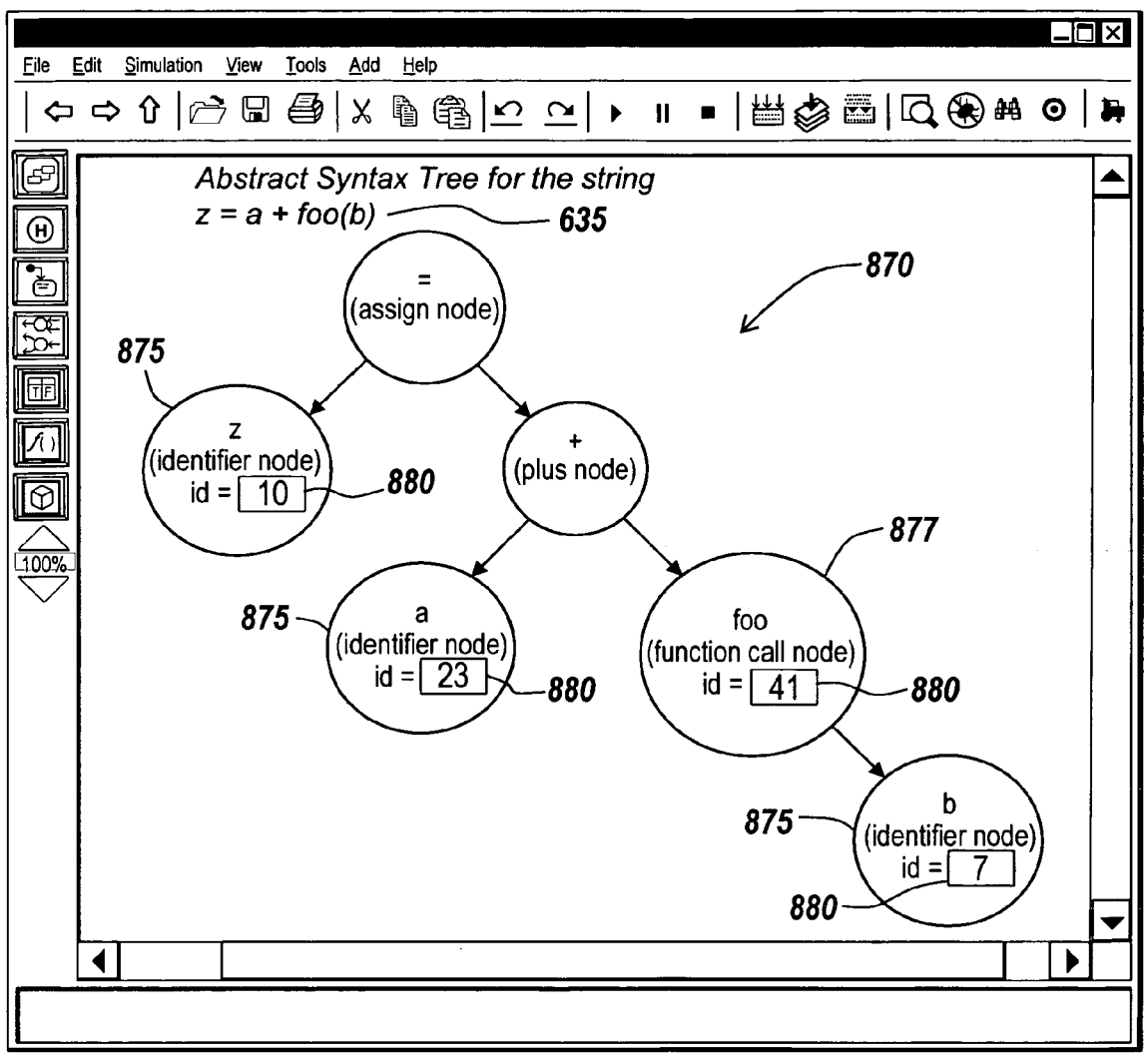

FIGS. 9A and 9B depict a screen sheet of an exemplary abstract syntax tree 870 that can be used in the resolution of a transition label 635 according to principles of the invention. In this example, the transition label 635 is "z=a+foo(b)." The tokenization module 710 and parsing module 720 receive the transition label 635 as a data string. The tokenization module 710 tokenizes the transitions label 635 into the following tokens: {"z", "=", "a", "+", "foo","(","b",")"}. The parsing module 720 uses Backus-Naur (BNF) grammar and generates the abstract syntax tree 870. Backus-Naur notation (more commonly known as BNF or Backus-Naur Form) is a specification that describes the syntax of the programming languages.

The initial abstract syntax tree 870, as shown in FIG. 9A, contains identifier nodes 875 and function-call nodes 877, which have not been resolved to their corresponding objects in Stateflow®. An "ID" field 880 is empty for each of the nodes. In order to generate the contents of the ID fields 880, the symbol resolution module 730 uses a hierarchical name matching scheme. For example, the file symbol_resolution.cpp on the included compact disk can be used to perform the symbol resolution. At the completion of symbol resolution scheme, the ID field 880 of each identifier node and function-call node in the abstract syntax tree 870 is populated by the "handle" of the Stateflow® object that represents this symbol.

In one embodiment, the Stateflow® object handle is an integer number that is used, instead of a pointer, to identify the object. Stateflow® maintains a mapping table (not shown) between the integer handle and the object pointer thus making them equivalent. Continuing with the above example, assume that the handles for the identifiers "z", "a", "foo" and "b" are 10, 23, 41, and 7, respectively. The mapping module 740 traverses the abstract syntax tree 870, computes a list of resolved symbols and their associated handles, and populates the ID fields 880 of the nodes, as shown in FIG. 9B. In this example, the result is a list of ordered pairs having a string portion and a handle portion as follows: {("z",10) ("a",23) ("foo",41) ("c",7)}. In one embodiment, the string portions of these ordered pairs are presented to the user in the context menu 650 as options for hyperlinking. When the user selects one of the strings, the corresponding integer handle is used to perform the above-described hyperlinking or hot-looking.

As described, the relationship between the text of the Stateflow® diagram and the Simulink® programming element represents an actively managed mapping between those elements. The relationship can also be thought of as a dynamic link creation between those elements. The relationship is dynamic in nature because the link/relationship is created with reference to the current state of the Stateflow® and Simulink® models. As these models change, the links/relationships change accordingly.

Figure 10A:
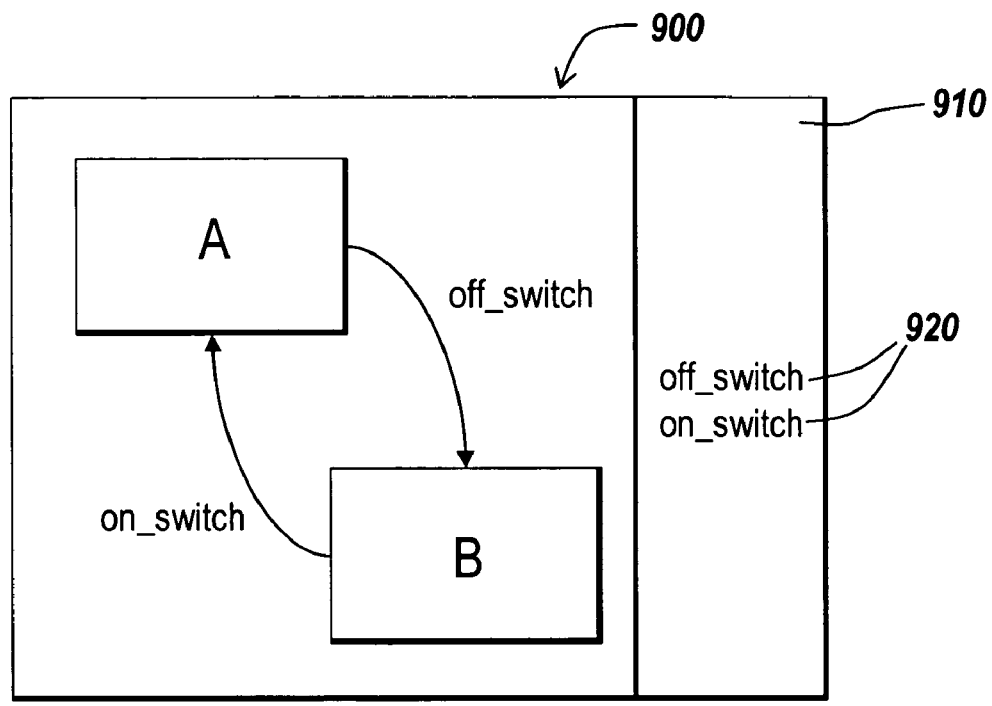
FIGS. 10A and 10B show embodiments of a Stateflow® diagram constructed according to principles of the invention
Figure 10B:
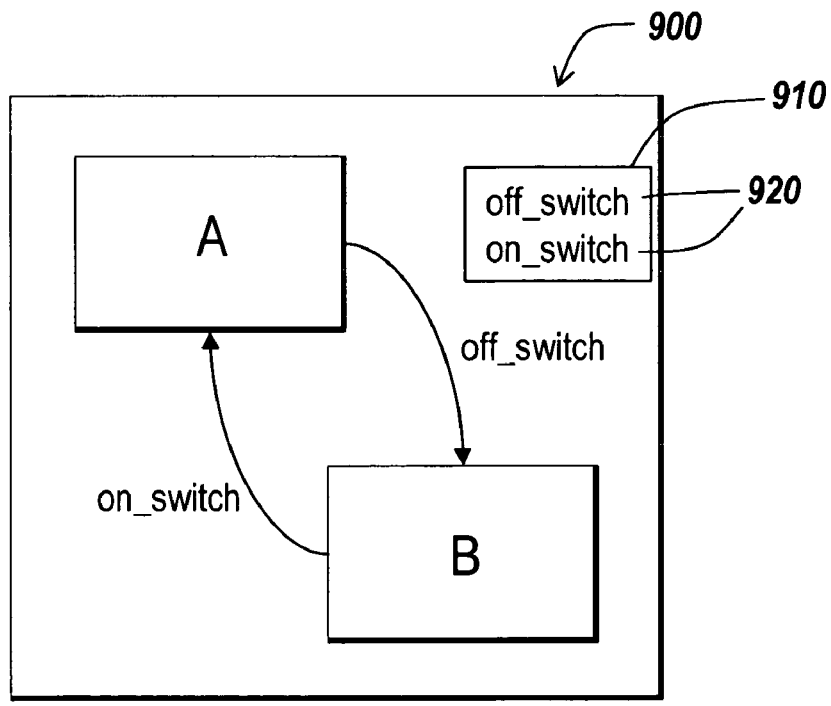

With reference to FIGS. 10A and 10B, other embodiments of an abstracted Stateflow® diagram are described. A state diagram 900 is created with a graphical editor (not shown) that is included as part of the graphical programming environment. The state diagram can include both graphical objects and non-graphical objects. The state diagram 900 includes a window portion 910 that displays the parsed and tokenized text 920 of the transitional labels used within the state diagram 900. In such an embodiment, the user can select the parsed and tokenized elements 920 from within the window 910 and have the associated graphical element with which the transition label is associated displayed to the user. In one embodiment, the window portion 910 is displayed as part of the graphical state editor. In another embodiment and with reference to FIG. 9B, the window portion 910 is positionable by the user.

The parsed and tokenized elements 920 can be displayed as hyperlinks. Clicking on the hyperlink invokes the symbol resolution and mapping features of the invention to locate and display the related element of the graphical programming environment. In another embodiment, the parsed and tokenized elements 920 are displayed as hot spots. Upon hovering or clicking the hot spot, the symbol resolution and mapping features of the inventions are invoked to display the related element of the graphical programming environment.

What is claimed is:

1. A computer-implemented method of locating an element of a graphical programming environment, the method comprising:
   selecting a label within a state diagram associated with a graphical model;
   processing the selected label to determine which element of a graphical model is associated with the label; and
   positioning the graphical model to display the element associated with the label to a user viewing the graphical model.

2. The method of claim 1, wherein processing the selected label comprises:
   parsing the label;
   tokenizing the parsed label to generate a symbol; and
   resolving the symbol to generate a location identifier.

3. The method of claim 2, wherein the location identifier is a handle.

4. The method of claim 1, wherein processing the selected label comprises:
   mapping an event to a port of a block of the graphical model; and
   tracing a connector associated with the port of the block of the graphical model to the destination.

5. The method of claim 4, wherein the destination is a function-call sub-system.

6. The method of claim 1, further comprising:
   displaying a context menu to the user after the user selects the label, the context menu including a menu item that, upon selection, invokes the processing of the selected label.

7. A system for locating an element of a graphical programming environment, the system comprising:
   a processor for executing instructions to provide:
      a graphical user interface displaying a state diagram having a label associated with an element of another portion of the graphical programming environment; and
      an analyzer module processing a selected label within the state diagram to generate a location identifier and determine which element of the graphical programming environment is associated with the location identifier.

8. The system of claim 7, wherein the analyzer module comprises a parsing module to parse the selected label.

9. The system of claim 8, wherein the analyzer module further comprises a tokenizer module to generate at least one symbol from the parsed label.

10. The system of claim 9, wherein the analyzer module further comprises a mapping module to analyze the at least one symbol and when the analysis results in an event identifier, locating a block of the programming environment including the event identifier.

11. The system of claim 7, wherein the location identifier is a handle.

12. A system for locating an element of a graphical programming environment, the system comprising:
   a processor for executing instructions to provide:
      a graphical user interface tool providing a graphical user interface having one or more elements; and
      a state diagram modeling tool, in communication with the graphical user interface tool, wherein selecting a label within a state diagram and executing an input action;
      positions the graphical user interface to display an element associated with the label to a user.

13. The system of claim 12, further comprising:
   a processing module, in communication with the state diagram modeling tool, generating a location identifier based on the selected label.

14. The system of claim 13, further comprising:
   an analyzer module, in communication with the processing module, for determining which element of the graphical user interface is associated with the label.

15. The system of claim 12, wherein at least one of the graphical user interface tool and the state diagram model tool executes on at least one of a first computing device and a second computing device.

16. The system of claim 12, wherein at least one of the graphical user interface tool and the state diagram modeling tool generated the graphical state diagram model from the graphical user interface via an application programming interface of the state diagram modeling tool.

17. A computer readable storage medium comprising instructions for locating an element of a graphical programming environment, the instructions causing a processor to:
   select a label within a state diagram associated with a graphical model;
   process the selected label to determine which element of a graphical model is associated with the label; and
   position the graphical model to display the element associated with the location identifier to a user viewing the graphical model.

18. The computer readable storage medium of claim 17, wherein the instructions for processing the selected label comprise instructions that cause a processor to:
   parse the label;
   tokenize the parsed label to generate a symbol; and
   resolve the symbol to generate a location identifier.

19. The computer readable storage medium of claim 17, wherein the instructions to process the selected label comprise instructions that cause a processor to:
   map an event to a port of a block of the graphical model; and
   trace a connector associated with the port of the block of the graphical model to the destination.

20. The computer readable storage medium of claim 19, wherein the destination is a function-call sub-system.

21. The computer readable storage medium of claim 18, wherein the location identifier is a handle.

22. The computer readable storage medium of claim 17, further comprising instructions that cause the processor to:
   display a context menu to the user after the use selects the label, the context menu including a menu item that, upon selection, invokes the processing of the selected label.

23. A computer-implemented method of locating an element of a graphical programming environment, the method comprising:
   displaying a tokenized label in a predetermined portion of a state diagramming environment;
   determining an element of a graphical model that is associated with the tokenized label when the tokenized label is selected by the user; and
   positioning the graphical model to display the element associated with the tokenized label to a user viewing the graphical model.

24. The method of claim 23, wherein displaying comprises displaying the tokenized label in a floating window.

25. A computer-implemented method of locating an element of a graphical programming environment, the method comprising:
   displaying a transition label of a state diagram as a hyperlink; and
   positioning a graphical model to display an element associated with the transition label to the user when the user selects the hyperlink.

* * * * *

UNITED STATES PATENT AND TRADEMARK OFFICE
CERTIFICATE OF CORRECTION

| | | |
|---|---|---|
| PATENT NO. | : 7,900,191 B1 | Page 1 of 1 |
| APPLICATION NO. | : 11/157382 | |
| DATED | : March 1, 2011 | |
| INVENTOR(S) | : Raghavan | |

It is certified that error appears in the above-identified patent and that said Letters Patent is hereby corrected as shown below:

On the title page item (57), Abstract (line 3), please change "feathrue" to --features--

At column 5, line 47 (Specification) of the printed patent, please change "understand" to --understood--

At column 7, line 34 (Specification) of the printed patent, please change "display" to --displayed--

Signed and Sealed this

Twenty-eighth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,900,191 B1 | |
| APPLICATION NO. | : 11/157382 | |
| DATED | : March 1, 2011 | |
| INVENTOR(S) | : Vijay Raghavan | |

It is certified that error appears in the above-identified patent and that said Letters Patent is hereby corrected as shown below:

On the Title Page, the Assignee (73) should read as follows:

"The MathWorks, Inc. Natick, MA"

Signed and Sealed this
Ninth Day of December, 2014

Michelle K. Lee
*Deputy Director of the United States Patent and Trademark Office*